Jan. 8, 1952  W. J. PATTERSON  2,581,877

PEDAL PROPELLED DRIVING MECHANISM FOR BICYCLES AND THE LIKE

Filed Feb. 15, 1950

Inventor:
William J. Patterson
By Cushman, Darby & Cushman
Attorneys

Patented Jan. 8, 1952

2,581,877

UNITED STATES PATENT OFFICE 2,581,877

PEDAL PROPELLED DRIVING MECHANISM FOR BICYCLES AND THE LIKE

William J. Patterson, Leeds, England

Application February 15, 1950, Serial No. 144,255
In Great Britain November 22, 1948

5 Claims. (Cl. 74—111)

This invention relates to pedal propelled driving mechanism for bicycles and the like and has for its chief object to provide a new or improved construction of driving mechanism which will permit of a more efficient application of driving power applied by the rider to be transmitted through the driving mechanism. A further object is to provide a cycle driving mechanism which can be driven either by reciprocation of the pedals or by rotary movement of the pedals.

According to the invention the driving mechanism comprises a driving sprocket in the form of a toothed ring which is provided with internal ratchet teeth engaged by two sets of pawls or their equivalent, said pawls being operatively connected with the pedals of the driving mechanism. The pedals may operate the pawls through the medium of one or more cross-heads and slides connected to said pawls through the medium of endless steel bands or cords which are mounted within the driving sprocket.

The arrangement will be such that the normal inoperative portion of the pedal travel, e. g. top dead centre of either pedal is used to transmit power in a vertical direction through the cross-head to the sprocket wheel until such time as the respective pedal moves round to a position where the pressure applied by the rider on the pedal can effect the driving of the sprocket in the normal way. The provision of two sets of pawls enables this to be effected by either pedal depending upon which is at the top of the travel or stroke.

In order that the invention may be clearly understood and readily carried into effect, the same will now be more fully described with reference to and by the aid of the accompanying drawings, wherein.

Figure 2:
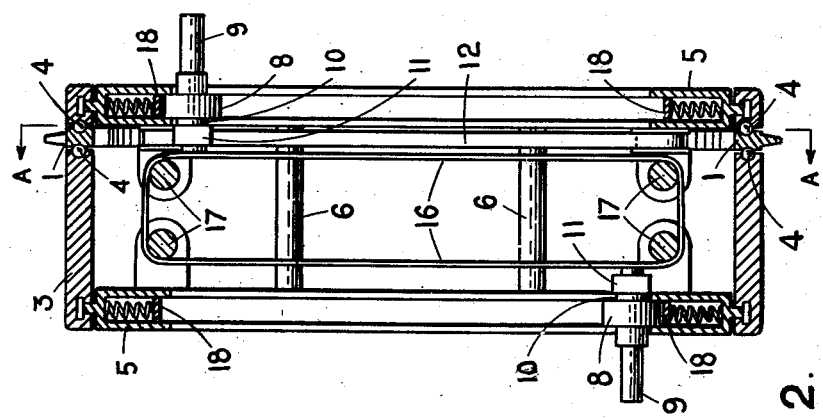
Figure 2 is a section on the line B—B of Figure 1.
Figure 1:
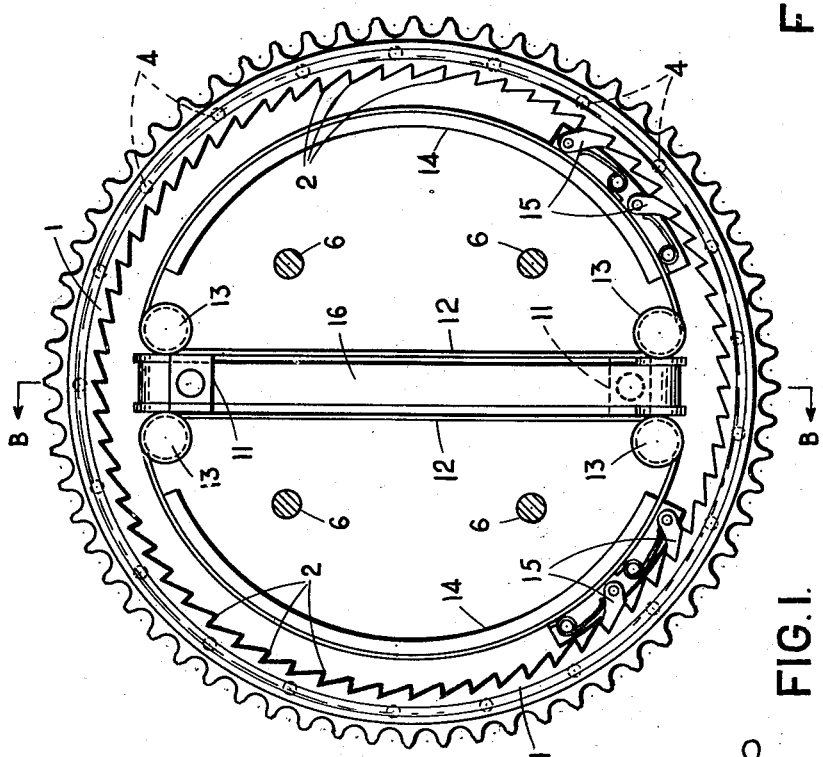
Figure 1 is a sectional elevation taken on the line A—A of Figure 2 of a sprocket wheel constructed in accordance with the invention.

Referring to the drawings, the drive sprocket 1 is constructed in the form of a ring having internal ratchet teeth 2 and is mounted in a circular frame or housing 3 in which it is supported by means of anti-friction balls 4. With the frame or housing 3 is a further frame comprising slotted side members 5 secured together by means of studs 6, the slots being indicated by the reference numeral 7. Each slot 7 has a trunnion 8 engaged therein and on the outer ends of the trunnions 8 are spindles 9 which carry the pedals (not shown), whilst on the inner ends of the trunnions 8 are extensions 10 carrying blocks 11. One block 11 is securely attached to a pair of steel bands 12, one steel band 12 passing round a pair of pulleys 13 carried on studs on the inner frame side members 5 and around an arcuate guide plate 14 in one side of the sprocket 1 and the other steel band 12 being similarly mounted in the other side of the sprocket 1 as shown in Figure 1. Each band carries a pair of spring loaded pawls 15 which engage the internal ratchet teeth 2 of the sprocket.

Both the blocks 11 are secured to a further endless band 16 which passes around guides 17 on the frame side members 5 so that when one trunnion moves in one direction the other trunnion moves in the opposite direction with the result that they are always at corresponding positions in the slots 7. At the ends of the slot 7 the trunnions engage spring loaded stops 18 which prevent any undue shock or jarring taking place when the trunnions reach the ends of their respective slots 7.

The operation of the driving mechanism is as follows: When a pedal reaches the top dead centre position of the rotation of the pinion, vertical pressure in a downward direction on the uppermost pedal and block or trunnion, causes the respective block to travel along its slot 7 and effect movement of the band 12, which in turn causes the pawls 15 associated with said band to drive the sprocket. The effect of driving the sprocket will transmit power through the usual chain and chain wheel and the bicycle or the like wheel. During this transmission of power the position of the pedals has been reversed by means of the band 16. It is thus possible for the rider by transferring his weight first to one pedal and then the other to cause a continuous rotary movement of the driving sprocket, whilst if desired he can alternatively adopt a rotary movement of the pedals in the normal way when the whole inner frame or housing will revolve carrying the driving sprocket with it.

The mechanism may be mounted in the frame of the bicycle or the like by means of a suitable bracket to which is secured the circular frame or housing 3.

The provision of duplicate bands 12 and pawls 15, one for each pedal makes the driving mechanism operable irrespective of which pedal is at the top of the stroke or top dead centre. The pawl and ratchet mechanism enables the blocks and pedals to move outwardly to the extreme ends of the slots when ever desired, or when the initial power transmitted through the band has been effected so that the normal gear ratio or leverage between the pedals and the sprocket can be maintained.

Thus it will be seen that as well as providing a means whereby the initial power losses are reduced by the pedals being at top dead centre a mechanism is provided by means of which the sprocket wheel can be driven by reciprocating vertical movement of the pedals as well as or in lieu of the normal rotary movement. Further, the ratio or leverage between the pedals and the sprocket can be varied in accordance with the position of the blocks and pedals relative to the slots.

I claim:

1. A pedal driving mechanism for both reciprocal and rotary pedal movements including in combination, a rotary housing, a driving sprocket rotatably mounted in the housing, said housing having slots in opposite sides thereof, pedal spindles reciprocally mounted in said slots, means operatively connecting said spindles to said driving sprocket so as to rotate the same upon reciprocal movement being imparted to the pedal spindles, and means for rotating said housing and said driving sprocket upon rotation of the pedal spindles.

2. A pedal driving mechanism as called for in claim 1 in which means are operatively connected to said pedal spindles for simultaneously moving the same in opposite directions.

3. A pedal driving mechanism for both reciprocal and rotary pedal movements including in combination, a rotary housing, a driving sprocket rotatably mounted in the housing and having internal ratchet teeth, said housing having diametrically disposed slots on opposite sides thereof, pedal spindles having blocks slidably mounted in said slots, flexible means movably mounted in said housing and having pawls engaging with said internal ratchet teeth, and means connecting one of the blocks to said flexible means so as to cause rotation of the driving sprocket upon reciprocal movement being imparted to the pedal spindles and for rotating said housing and driving sprocket upon rotation of the pedal spindles.

4. A pedal driving mechanism as called for in claim 3 in which means are operatively connected to said pedal spindles for simultaneously moving the same in opposite directions in said slots.

5. A pedal driving mechanism for both reciprocal and rotary pedal movements including in combination, a rotary housing, a driving sprocket rotatably mounted in the housing and having internal ratchet teeth, said housing having diametrically disposed slots on opposite sides thereof, pedal sprockets having blocks slidably movable in said slots, flexible straps movably mounted in said housing and having pawls engaging said internal ratchet teeth, means connecting one of said blocks to said flexible band, shock-preventing means at the ends of said slots for engaging said pedal spindles, and flexible means connecting the pedal spindles for simultaneously moving the same in opposite directions during the operation of the driving mechanism.

WILLIAM J. PATTERSON.

REFERENCES CITED

The following references are of record in the file of this patent:

UNITED STATES PATENTS

| Number | Name | Date |
|---|---|---|
| 556,802 | Boyle | Mar. 24, 1896 |
| 2,489,833 | Tamborello | Nov. 29, 1949 |